US005598165A

United States Patent [19]

Winberg et al.

[11] Patent Number: 5,598,165

[45] Date of Patent: Jan. 28, 1997

[54] METHOD FOR THE CONTROL OF A RADAR STATION

[75] Inventors: H. P. Erik Winberg, Mölnlycke; S. Roland Jonsson, Göteborg, both of Sweden

[73] Assignee: Telefonaktiebolaget LM Ericsson, Stockholm, Sweden

[21] Appl. No.: 538,342

[22] Filed: Oct. 3, 1995

[51] Int. Cl.[6] .................................................. G01S 13/24

[52] U.S. Cl. .......................................... 342/137; 342/129

[58] Field of Search .................................. 342/137, 129, 342/130, 131, 159, 162

[56] References Cited

U.S. PATENT DOCUMENTS

| | | | |
|---|---|---|---|
| 4,851,848 | 7/1989 | Wehner | 342/25 |
| 5,068,666 | 11/1991 | Voles | 342/129 |
| 5,227,796 | 7/1993 | Arvidsson | 342/13 |
| 5,347,283 | 9/1994 | Krizek et al. | 342/137 |

FOREIGN PATENT DOCUMENTS

| | | |
|---|---|---|
| 366406 | 5/1990 | European Pat. Off. . |
| 2412852 | 7/1979 | France . |
| 2134741 | 8/1984 | United Kingdom . |

OTHER PUBLICATIONS

E. L. Titlebaum et al., "Ambiguity Properties of Quadratic Congruential Coding," IEEE Transactions on Aerospace and Electronic Systems, vol. 27, No. 1 (Jan. 1, 1991).

Donald R. Wehner, "High Resolution Radar", chapt. 5, *Synthetic High–Range–Resolution Radar* (1987).

*Primary Examiner*—Daniel T. Pihulic

*Attorney, Agent, or Firm*—Burns, Doane, Swecker & Mathis, L.L.P.

[57] ABSTRACT

A method of controlling the transmission of a number of radio-frequency pulses having different frequencies in a radar device. The time interval between two consecutively transmitted pulses is determined by a pulse repetition frequency. The total number of radio-frequency pulses is distributed between at least two groups, each group comprising a number of pulses having different frequencies. Each group is repeatedly transmitted a number of times in succession. The time interval between two transmitted pulses having the same frequency in a group is determined by the number of pulses having different frequencies in the group.

7 Claims, 1 Drawing Sheet

METHOD FOR THE CONTROL OF A RADAR STATION

BACKGROUND

The present invention relates to a method for controlling the distribution of different transmission frequencies in a radar station of the high resolution type, in which the transmission frequency of the transmitted pulses is changed between the pulses.

The range resolution which is possible to attain with a radar station is in principle determined by the bandwidth of the transmitted radar pulse. For a good range resolution it is desirable to make the transmitted pulse very short which results in a wide bandwidth. As the radar transmitter's maximum output is limited, short transmission pulses will result in a reduction of the transmitted amount of energy with, among other things, a reduced range as a consequence. The possibility to improve the range resolution by shortening transmission pulses is therefore limited.

The development of high resolution radar stations has therefore gone towards a technique in which special signal processing improves the resolution. This type of radar system often uses pulse compression in some form to achieve a good range resolution. For example, frequency coding of the transmitted pulse can be used by sweeping the transmission frequency during the time interval of the pulse. This method, however, has the disadvantage that it requires a wide bandwidth in large parts of the radar system, which is often difficult and/or costly to achieve.

A method which requires a narrower momentary bandwidth is previously known from U.S. Pat. No. 4,851,848. In this patent a radar system is described in which the conventional pulse compression is replaced with a system where the transmission frequency for a certain number of transmitted pulses is changed step by step from pulse to pulse within a certain frequency range. After the transmission of such a sequence ("burst") of pulses with different frequencies, the sequence is repeated. The signals received from a number of sequences are stored together and, by using among other things Fourier transformation, a very good range resolution can be obtained without the need for a wide momentary bandwidth in the radar.

A similar example of a radar system using frequency stepping from pulse to pulse is also described in the book "High Resolution Radar" by Donald R Wehner, Artech House, 1987, chapter 5.

In every radar system there is also the requirement to be able to separate a useful signal from interfering signals. What is a useful respective interfering signal depends on the application. If, for example, the useful signal stems from an airplane body, then ground clutter, engine modulation etc. are interfering signals. To filter out the interfering signals it is possible to take advantage of the fact that they have different Doppler frequencies. The filtration of Doppler frequencies necessitates a number of pulses using one and the same transmission frequency where the filtration performance characteristic is set by the number of pulses and their repetition frequency.

Common to all known systems is that all the different frequencies which are used are part of each sequence. When the frequency is Stepped between a large number of frequencies it will take a long time to complete one sequence before the next sequence can be started. Accordingly, it will take a long time for two pulses with the same frequency to repeat. This time interval is called FRI (Frequency Repetition Interval) and its repetition frequency FRF=1/FRI. This means a relatively low FRF when FRF=PRF/(number of frequencies) where PRF denotes the pulse repetition frequency of the radar system. It is desirable, especially in airborne applications, to have a higher FRF to obtain the necessary performance characteristic for the Doppler filtration. One way of changing the FRF is to increase the sweep speed, which increases the PRF which determines the time between two transmitted pulses. This parameter cannot, for different reasons, be set too high or be chosen freely.

Another parameter of great interest, especially for moving targets, is the total measuring time. The measuring time is to be understood as the time for transmitting the required number of pulses needed for the Doppler filtration, on all the transmitted frequencies.

In the case with frequency stepping, the measuring time= PRI*(total number of necessary pulses) and FRF=PRF/(number of frequencies).

In another case it is conceivable to transmit a number of pulses on one frequency, change the frequency and transmit a number of pulses on this new frequency and so on until all frequencies have been cycled through. In this case the measuring time will be=PRI*(total number of pulses) and FRF=PRF.

From these two cases it is evident that, when the FRF is fixed, then the first case results in a high PRF and a short measuring time while the second case results in a low PRF and a long measuring time, which implies that it is not possible to combine a "just right" PRF with a short measuring time.

SUMMARY

One object of the present invention is thus to provide a method for a radar station through which it is possible, by changing the frequency of the transmitted pulses for a given pulse repetition frequency (PRF), to freely choose the repetition frequency (FRF) with which pulses having the same frequency are transmitted, resulting in both a short total measuring time and a good Doppler filtration performance characteristic.

Said object is achieved by selecting and transmitting a group, a subsequence, comprising a smaller number of the total number of pulses with different frequencies, according to a certain pattern. After that a new subsequence is chosen and transmitted. This is repeated until all subsequences, and therewith all the pulses with different frequencies, have been transmitted. The whole procedure can thereafter be repeated.

Said object is also achieved by a method for controlling the transmission of a first number of radio frequency pulses with different frequencies in a radar arrangement. The radio frequency pulses can, for example, be phase modulated, frequency modulated, or frequency modulated with a substantially linear frequency sweep. The time interval between two consecutively transmitted pulses (PRI) is determined by a first pulse repetition frequency (PRF). The transmitted pulses are distributed/split between at least two groups, each comprising a number of pulses with different frequencies. The pulses with different frequencies within the group can, for example, be arbitrarily chosen among the first number of pulses. The number of pulses with different frequencies within the groups can, as an example, be the same for all of the groups. The sum of the number of pulses with different frequencies comprised in the groups make up the first number of pulses. Each group is transmitted repeteadly a certain or predetermined number of times in succession. The number of times that each group is repeatedly transmitted can, as an example, be the same for all of the groups. Thus the time interval between two transmitted pulses with the same frequency is determined by the number of pulses with different frequencies in the group.

DETAILED DESCRIPTION

Figure 1:
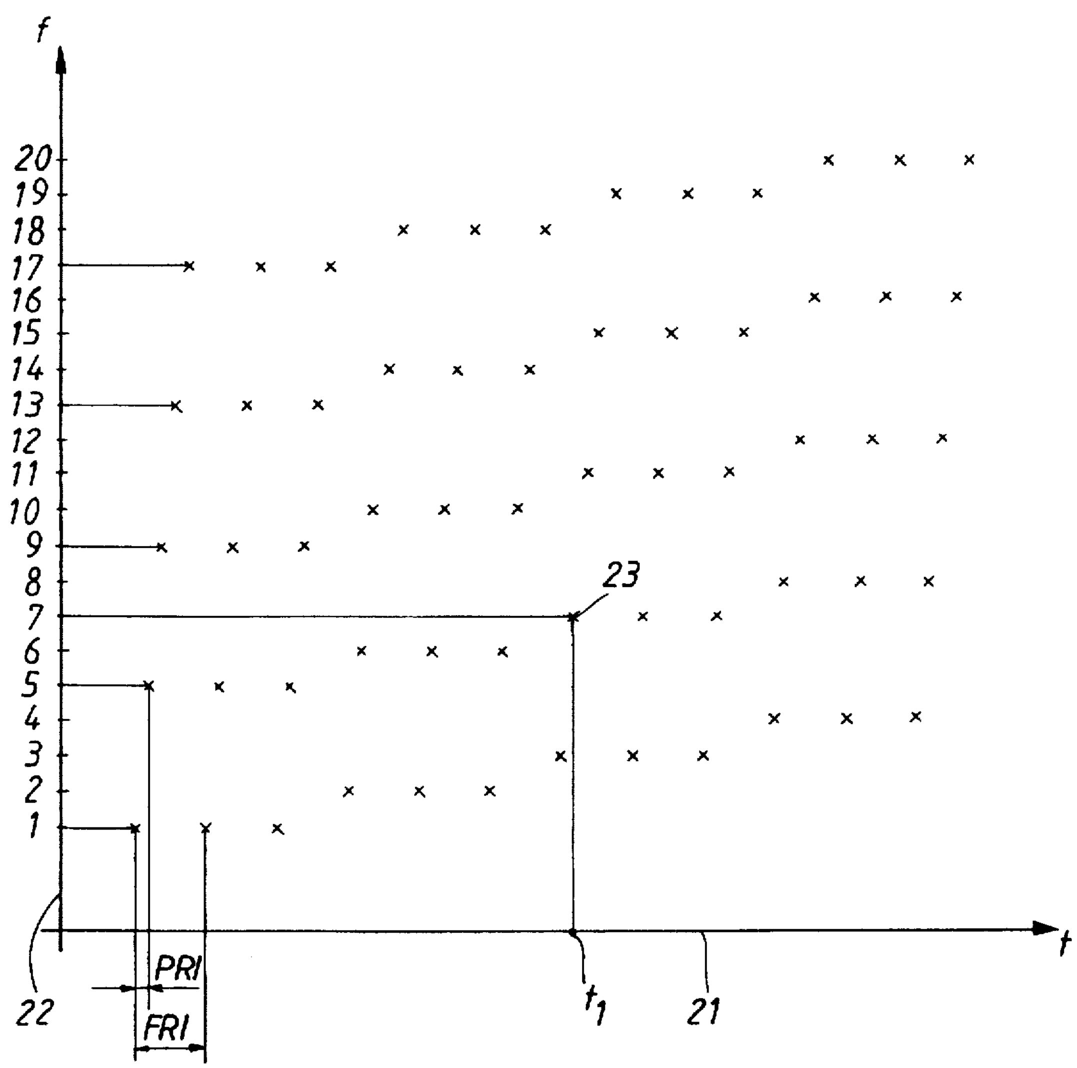
FIG. 1 shows schematically an example according to the invention in the form of a pattern for transmitting pulses having different frequencies.

The method which is used in the previously mentioned known radar systems to control the frequencies of the transmitted pulses implies that if n pulses having different frequencies have to be transmitted and the time interval between each transmitted pulse is PRI (pulse repetition interval) then it will take the time n*PRI before a pulse having a certain frequency will be transmitted again. The repetition frequency for pulses having the same transmission frequency, FRF, is thus=1/(n*PRI), whilst the pulse repetition frequency for two consecutively transmitted pulses, PRF, is=1/PRI.

As previously mentioned it is, for different reasons, not possible to choose the PRF freely. It is, for example, not possible to choose a too high frequency on account of technical considerations due to the apparatus. Further, the PRF determines the maximum unambiguous range which, for technical reasons regarding the system, is often not desirable to be too short. This means that the FRF can become inconveniently low if the number of different frequencies n is large.

According to the method of the invention a number of pulses ($n_1$) with different frequencies are chosen from the total number of pulses (n) and are allowed to make up a first subsequence. This subsequence is transmitted repeatedly a number of times N in succession. Each subsequence takes the time $n_1$*PRI to transmit, which means that the FRF in this case is=1/($n_1$*PRI), that is the FRF is n/$n_1$ times greater compared to when subsequences are not used.

For the next subsequence $n_2$ new pulses with different frequencies are chosen and the subsequence is transmitted repeatedly a number of times in succession. The FRF for this case is thus n/$n_2$ times greater compared to when subsequences are not used and if the same PRF is used as in the first subsequence.

Further subsequences are formed and transmitted in a similar way until all the pulses having different frequencies have been transmitted, whereupon the whole event can be repeated from the first subsequence.

To further explain the method according to the invention, an example of its application will be described as follows with reference to FIG. 1.

The diagram shown in FIG. 1 has a time axis 21 (X-axis) and a frequency axis 22 (Y-axis). On the frequency axis 22 there are a number of points 1–20 marked, which correspond to twenty different frequency values. In the diagram there is also a number of points indicated. Each point, for example the point 23, indicates that at the time connected with the point, for point 23 $t_1$, the frequency connected with the point is transmitted, which for the point 23 corresponds to frequency number 7.

The diagram intends to show a case with a radar station for which the number of different frequencies that are to be transmitted (n) is equal to twenty. The time interval between every pulse is PRI. If the different frequencies had been transmitted in an earlier known way, that is in a sequence with frequency number 1 followed by frequency number 2 and so on until frequency number 20, whereafter the sequence is repeated, then the time between two pulses with the same frequency would be 20*PRI.

However, according to the invention a smaller number of frequencies ($n_1$) are chosen, in the example number 1, 5, 9, 13 and 17, that is five frequencies. These make up a first subsequence. This subsequnce is, in the example, transmitted three times in a row, which means that the time interval FRI between two pulses with the same frequency becomes 5*PRI. The FRF thus becomes 20/5=4 times higher than with a conventional transmission.

After the first subsequence has been transmitted three times a new subsequence comprising the frequencies 2, 6, 10, 14 and 18 is transmitted a number of times and thereafter a further two subsequences comprising the frequencies 3, 7, 11, 15, 19 and 4, 8, 12, 16, 20 respectively. The course of events can thereafter be repeated starting with the first subsequence.

By selecting a number of different subsequences it is thus possible to vary the FRF within wide limits without having to change the PRF. The opposite is also valid that the FRF can be kept constant even if the PRF is changed. It is important to point out that the number of frequencies in the subsequences can be different ($n_1 \neq n_2$) and that the frequencies comprised in the subsequences can be randomly chosen among the total number of frequencies.

In the described example the individual characteristics of the pulses have not been treated. These can thus be unmodulated, which means that every pulse during the pulse time interval has a constant frequency. The pulses can also be phase modulated whereby the phase of the transmission signal is changed during the pulse time interval, for example by dividing the pulse into subpulses with different phase positions.

The pulses can also be frequency modulated so that the frequency of the transmission signal varies during the pulse time interval, for example by sweeping it substantially linearly within a certain frequency range. In this case the expression "frequencies" (1–20) previously used in the description refers to the frequency of the signal ("carrier frequency") that is frequency modulated.

The invention is not restricted to the above described embodiments, but can be varied within the scope of the appended claims.

What is claimed is:

1. In a radar apparatus, a method of controlling transmission of a total number of radio-frequency pulses having different frequencies, the method comprising the steps of:

distributing the total number of radio-frequency pulses between at least two groups, each group comprising a number of radio-frequency pulses having different frequencies; and transmitting each group repeatedly a number of times in succession, wherein a time interval between two transmitted radio-frequency pulses having the same frequency is determined by the number of radio-frequency pulses having different frequencies in the group.

2. The method of claim 1, wherein radio-frequency pulses having different frequencies in a group are arbitrarily chosen among the total number of radio-frequency pulses.

3. The method of claim 1, wherein each group has the same number of radio-frequency pulses having different frequencies.

4. The method of claim 1, wherein each group is repeatedly transmitted the same number of times.

5. The method of claim 1, wherein the radio-frequency pulses are phase modulated.

6. The method of claim 1, wherein the radio-frequency pulses are frequency modulated.

7. The method of claim 6, wherein the radio-frequency pulses are frequency modulated with a substantially linear frequency sweep.

* * * * *

UNITED STATES PATENT AND TRADEMARK OFFICE
CERTIFICATE OF CORRECTION

PATENT NO. : 5,598,165

DATED : January 28, 1997

INVENTOR(S) : H.R. Erik WINBERG et al.

It is certified that error appears in the above-identified patent and that said Letters Patent is hereby corrected as shown below:

On the title page:

After "[22] Filed: Oct. 2, 1992", please add the following lines:

--[30] Foreign Application Priority Data

Oct. 4, 1994 [SE] Sweden . . . . . . . . 9403352-9--; and

Column 1, line 62, please delete "Stepped" and insert therefor --stepped--.

Signed and Sealed this

Twenty-seventh Day of May, 1997

Attest:

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 5,598,165

DATED : Jan. 28, 1997

INVENTOR(S) : Winberg et al.

It is certified that error appears in the above-identified patent and that said Letters Patent is hereby corrected as shown below:

On the title page, after "[22] Filed: Oct. 3, 1995", please add the following lines:

--[30] Foreign Application Priority Data

Oct. 4, 1994 [SE] Sweden . . . . . . . . .9403352-9--; and

Column 1, line 62, please delete "Stepped" and insert therefor --stepped--.

This certificate supersedes Certificate of Correction issued May 27, 1997.

Signed and Sealed this

Twelfth Day of August, 1997

*Attest:*

BRUCE LEHMAN

*Attesting Officer* *Commissioner of Patents and Trademarks*